United States Patent
Kuroda et al.

(10) Patent No.: US 10,007,666 B2
(45) Date of Patent: Jun. 26, 2018

(54) DEVICE AND METHOD FOR MANAGING STRUCTURED DOCUMENT, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Minato-ku, Tokyo (JP)

(72) Inventors: Yosuke Kuroda, Kanagawa (JP); Minoru Inata, Kanagawa (JP); Masakazu Hattori, Kanagawa (JP)

(73) Assignees: TOSHIBA SOLUTIONS CORPORATION, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 194 days.

(21) Appl. No.: 13/845,962

(22) Filed: Mar. 18, 2013

(65) Prior Publication Data
US 2014/0074875 A1    Mar. 13, 2014

Related U.S. Application Data

(63) Continuation of application No. PCT/JP2012/072940, filed on Sep. 7, 2012.

(51) Int. Cl.
*G06F 17/30* (2006.01)

(52) U.S. Cl.
CPC .. *G06F 17/30011* (2013.01); *G06F 17/30932* (2013.01); *G06F 17/30938* (2013.01)

(58) Field of Classification Search
CPC ......... G06F 17/30011; G06F 17/30932; G06F 17/30938
See application file for complete search history.

(56) References Cited

U.S. PATENT DOCUMENTS 7,219,091 B1 *  5/2007  Bruno ............... G06F 17/30938
7,451,144 B1 * 11/2008  Koudas ............. G06F 17/30923
(Continued)

FOREIGN PATENT DOCUMENTS

JP     10-198697      7/1998
JP     2012-194950   10/2012

OTHER PUBLICATIONS

"Structural Joins: A Primitive for Efficient XML Query Pattern Matching", Al-khalifa et al dated 2002.*
(Continued)

*Primary Examiner* — Tarek Chbouki
(74) *Attorney, Agent, or Firm* — Amin, Turocy & Watson LLP

(57) ABSTRACT

According to an embodiment, a structured document management device includes a query data receiving unit; a structural condition dividing unit; a structural condition rewriting unit; and a query execution unit. The query data receiving unit is configured to receive query data for searching a structured document. The structural condition dividing unit is configured to divide the query data into elements including a structural condition. The structural condition rewriting unit is configured to rewrite the structural condition into a rewritten query when a type of the structural condition is other than a descendant structural condition. The rewritten query is predetermined to include a joining process with a descendant structural condition so as not to affect structural conditions appearing before and after the structural condition. The query execution unit is configured to output a search result in response to query data that includes the structural condition and the rewritten query.

10 Claims, 13 Drawing Sheets

(56) References Cited

U.S. PATENT DOCUMENTS

| | | | |
|---|---|---|---|
| 7,975,220 B2 | 7/2011 | Hattori | |
| 2002/0133497 A1* | 9/2002 | Draper | G06F 17/2205 |
| 2006/0053128 A1* | 3/2006 | Gestrelius et al. | 707/101 |
| 2006/0212420 A1* | 9/2006 | Murthy | G06F 17/30911 |
| 2007/0112813 A1* | 5/2007 | Beyer | G06F 17/30935 |
| 2008/0010302 A1* | 1/2008 | Fontoura | G06F 17/30442 |
| 2008/0208843 A1* | 8/2008 | Nagasawa | 707/5 |
| 2008/0235252 A1* | 9/2008 | Sakai et al. | 707/100 |
| 2008/0240619 A1* | 10/2008 | Kanawa | 382/305 |
| 2009/0030887 A1 | 1/2009 | Asai et al. | |
| 2009/0222458 A1* | 9/2009 | Hattori | 707/10 |
| 2009/0240675 A1 | 9/2009 | Asai et al. | |
| 2013/0110819 A1* | 5/2013 | Attaluri | G06F 17/30492 707/714 |
| 2014/0244681 A1* | 8/2014 | Chikkam et al. | 707/765 |

OTHER PUBLICATIONS

Locking-Aware Structural Join Operators for XML Query Processing), mathis et al, 2006.*

D. Olteanu, H. Meuss, T. Furche, and F. Bry, XPath: Looking Forward, InProc. EDBT Workshop (XMLDM), vol. 2490 of LNCS, pp. 109-127, Springer, 2002.

Chinese Office Action for Chinese Patent Application No. 201280002750.1 dated Jun. 2, 2016.

\* cited by examiner

FIG.4

STRUCTURED DOCUMENT D1

```
<book>
 <title>Data on the Web</title>
 <author>
  <last>Abiteboul</last>
  <first>Serge</first>
 </author>
 <author>
  <last>Suciu </last>
  <first>Dan </first>
 </author>
 <publisher>Morgan Kaufmann Publishers</publisher>
</book>
```

STRUCTURED DOCUMENT D2

```
<book>
 <title>The Economics of Technology</title>
 <editor>
  <last>Gerbarg</last>
  <first>Darcy</first>
 </editor>
 <publisher>Kluwer Academic Publishers</publisher>
</book>
```

Q1

/child::book/child::author/child::last/child::text()[. = "Suciu"]
   /ancestor-or-self::author/preceding-sibling:author

FIG.7

[1]/child::book
[2]/child::author
[3]/child::last
[4]/child::text()
[5][. = "Suciu"]
[6]/ancestor-or-self::author
[7]/preceding-sibling:author

FIG.8

| AXIS NAME | STRUCTURAL CONDITION TYPE | PROCESSING CONTENT |
|---|---|---|
| child | DESCENDANT STRUCTURAL CONDITION | ACQUIRE NODE ON ONE LAYER BELOW |
| descendant | | ACQUIRE NODES ON ALL LOWER LAYERS |
| descendant-or-self | | ACQUIRE NODES ON SUBJECT LAYER AND ALL LOWER LAYERS |
| parent | ANCESTOR STRUCTURAL CONDITION | ACQUIRE NODE ONE LAYER ABOVE |
| ancestor | | ACQUIRE NODES ON ALL UPPER LAYERS |
| ancestor-or-self | | ACQUIRE NODES ON SUBJECT LAYER AND ALL UPPER LAYERS |
| preceding-sibling | SIBLING STRUCTURAL CONDITION | ACQUIRE NODE OF WHICH OCCURRENCE ORDER IS EARLIER THAN SUBJECT NODE AMONG NODES HAVING THE SAME PARENT AS THE SUBJECT NODE |
| following-sibling | | ACQUIRE NODE OF WHICH OCCURRENCE ORDER IS LATER THAN SUBJECT NODE AMONG NODES HAVING THE SAME PARENT AS THE SUBJECT NODE |
| preceding | ORDER STRUCTURAL CONDITION | ACQUIRE NODE OF WHICH OCCURRENCE ORDER IS EARLIER THAN SUBJECT NODE AMONG ALL NODES EXCLUDING ANCESTOR NODE OF THE SUBJECT NODE IN STRUCTURED DOCUMENT |
| following | | ACQUIRE NODE OF WHICH OCCURRENCE ORDER IS LATER THAN SUBJECT NODE AMONG ALL NODES EXCLUDING DESCENDANT NODE OF THE SUBJECT NODE IN STRUCTURED DOCUMENT |

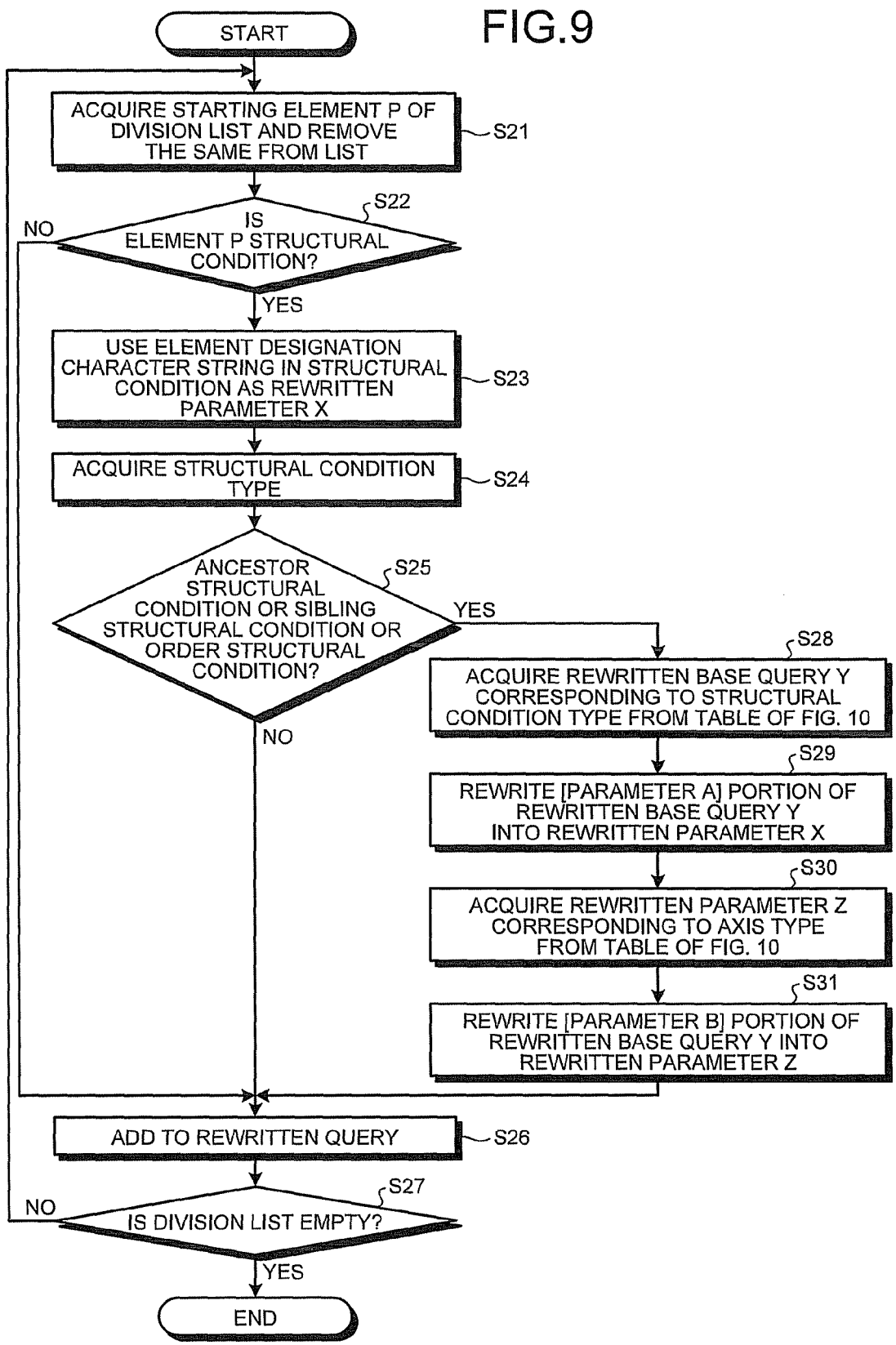

FIG.10

| NUMBER | AXIS NAME | STRUCTURAL CONDITION TYPE | REWRITTEN BASE QUERY | REWRITTEN PARAMETER |
|---|---|---|---|---|
| 1 | parent | ANCESTOR STRUCTURAL CONDITION | (let $1 := .<br>for $2 in root($1)/descendant-or-self::[PARAMETER A]<br>let $3 := $2/[PARAMETER B]::node()<br>where $1 intersect $3<br>return $2) | child |
| 2 | ancestor | | | descendant |
| 3 | ancestor-or-self | | | descendant-or-self |
| 4 | preceding-sibling | SIBLING STRUCTURAL CONDITION | (let $1 := .<br>for $3 in root($2)/descendant-or-self::node()<br>let $4 := $3/child::node()<br>where $2 intersect $4<br>return $4<br>where $2 [PARAMETER B] $1 and $4 intersect $1<br>return $2) | << |
| 5 | following-sibling | | | >> |
| 6 | preceding | ORDER STRUCTURAL CONDITION | (let $1 := .<br>for $2 in root($1)/descendant::[PARAMETER A]<br>let $3 := $2/descendant::node()<br>where $2 << $1 and $1 except $3<br>return $2) | |
| 7 | following | | (let $1 := .<br>for $2 in root($1)/descendant::[PARAMETER A]<br>let $3 := $1/descendant::[PARAMETER A]<br>where $2 >> $1 and $2 except $3<br>return $2) | |

FIG.11

```
/child::book/child::author/child::last/child::text()[. = "Suciu"]/
(
  let $1 := .
  for $2 in root($1)/descendant-or-self::author
  let $3 := $2/descendant-or-self::node()
  where $1 intersect $3
  return $2
)
/
(
  let $1 := .
  for $2 in root($1)/descendant::author
  let $5 :=
      for $3 in root($2)/descendant-or-self::node()
      let $5 := $3/child::node()
      where $2 intersect $5
      return $5
  where $2 << $1 and $5 intersect $1
  return $2
)
```

FIG.12

```
<author>
  <last>Abiteboul</last>
  <first>Serge</first>
</author>
```

FIG.16

| NUMBER | STARTING AXIS NAME | SUBSEQUENT AXIS NAME | SUBSEQUENT ELEMENT CHARACTER STRING | REWRITTEN BASE QUERY |
|---|---|---|---|---|
| 1 | child | parent | node() | [child:: 【PARAMETER C】] |

FIG.17

REWRITTEN RESULT OF STRUCTURAL CONDITION

/child::book([child::editor])/child::title

DEVICE AND METHOD FOR MANAGING STRUCTURED DOCUMENT, AND COMPUTER PROGRAM PRODUCT

CROSS-REFERENCE TO RELATED APPLICATION

This application is a continuation of PCT international Application Ser. No. PCT/JP2012/072940, filed on Sep. 7, 2012, which designates the United States; the entire contents of which are incorporated herein by reference.

FIELD

Embodiments described herein relate generally to a structured document management device, a structured document management method, and computer program product.

BACKGROUND

In the related art, a structured document management device for storing and searching structured document data described in an extensible markup language (XML) or the like is known. To allow a structured document management device to search structured document data, like a query language SQL in a relational database management system (RDBMS), an XML query language (XQuery) for XML data is defined and is supported in many structured document management devices.

XQuery is a language for treating an XML dataset as a database, and means for acquiring, aggregating, and analyzing a dataset that meets certain conditions is provided. Since XML data has a layered logical structure (hierarchical structure) in which elements such as a parent, a child, or siblings are combined, conditions (structural conditions) for this hierarchical structure can be designated as conditions.

In the structural condition processing, it is necessary to perform a structure matching process of checking whether the structured document data stored in the structured document management device has a structure that meets conditions. This structure matching process can be performed at a relatively high speed if the structural condition includes a process (descendant structural condition) that designates a path from a higher layer to a lower layer. However, if the structural condition includes a process (ancestor structural condition) that designates a path from a lower layer to a higher layer, a process (sibling structural condition) that designates an antero-posterior relation on the same layer, or a process (order structural condition) that designates an order relation of elements included in XML data within the structural condition, it is difficult to perform the structure matching process at a high speed.

To solve this problem, an attempt has been made to accelerate the structure matching process by transforming the ancestor structural condition, the sibling structural condition, and the order structural condition into a combination of a join operation with the descendant structural condition. For example, a method which uses an ID called structure guide and allocated to a tag that constitutes a registration document is known. Moreover, the same can be realized by rewriting the ancestor structural condition, the sibling structural condition, and the order structural condition in XQuery as the same XQuery.

However, since the allocated ID, which is called structure guide, is required when registering a document, it is not possible to determine a structure guide in advance when processing an external resource that is not registered in the structured document management device or a structured document that is temporarily generated in the XQuery. In such a case, since it is not possible to generate an execution plan obtained by transforming the ancestor structural condition, the sibling structural condition, and the order structural condition, there is a problem in that the efficiency of the structure matching process deteriorates. Moreover, since a process of transforming XQuery in a unique format that uses the structure guide is required, there is a problem in that the configuration becomes complex.

Moreover, when structural conditions are rewritten, since it is necessary to rewrite all structural conditions that are described earlier than a target structural condition, there is a problem in that the overhead of rewriting is heavy. Moreover, since only one structured document is used as a target, if the rewritten XQuery is applied to a structured document set, the refining condition for the structured document set is not utilized, and the performance often deteriorates. Further, since XQuery needs to be applied to one document, the performance deteriorates.

BRIEF DESCRIPTION OF THE DRAWINGS

FIG. 4 is an explanatory diagram illustrating an example of structured document data that is registered in a structured document DB according to the first embodiment;

FIG. 7 is an explanatory diagram illustrating the results of a structural condition dividing process on query data according to the first embodiment;

FIG. 8 is an explanatory diagram illustrating a list of structural conditions which are divided by the structural condition dividing process according to the first embodiment;

FIG. 9 is a flowchart illustrating a flow of a structural condition rewriting process according to the first embodiment;

FIG. 10 is an explanatory diagram illustrating an example of a list of rules necessary when a structural condition rewriting unit rewrites the structural condition rewriting process according to the first embodiment;

FIG. 11 is an explanatory diagram illustrating an example of the rewritten results of the query data according to the first embodiment;

FIG. 12 is an explanatory diagram illustrating result data of query data according to the first embodiment;

FIG. 16 is an explanatory diagram illustrating an example of a list of rules necessary when a structural condition rewriting unit rewrites the structural condition rewriting process according to the second embodiment;

FIG. 17 is an explanatory diagram illustrating an example of the rewritten results of the query data according to the second embodiment.

DETAILED DESCRIPTION

According to an embodiment, a structured document management device includes a query data receiving unit; a structural condition dividing unit; a structural condition rewriting unit; and a query execution unit. The query data receiving unit is configured to receive an input of query data for searching a structured document having a layered logical structure. The structural condition dividing unit is configured to divide the query data into a plurality of elements including a structural condition. The structural condition rewriting unit is configured to rewrite the structural condition into a rewritten query when a type of the structural condition is other than a descendant structural condition that designates a path from a higher layer to a lower layer of the structured document. The rewritten query is determined in advance to include a joining process with a descendant structural condition for each type of structural conditions so as not to affect structural conditions appearing before and after the structural condition. The query execution unit is configured to output a search result in response to query data that includes the structural condition and the rewritten query.

Hereinafter, a structured document management device according to an embodiment will be described with reference to the drawings.

First Embodiment

Figure 1:
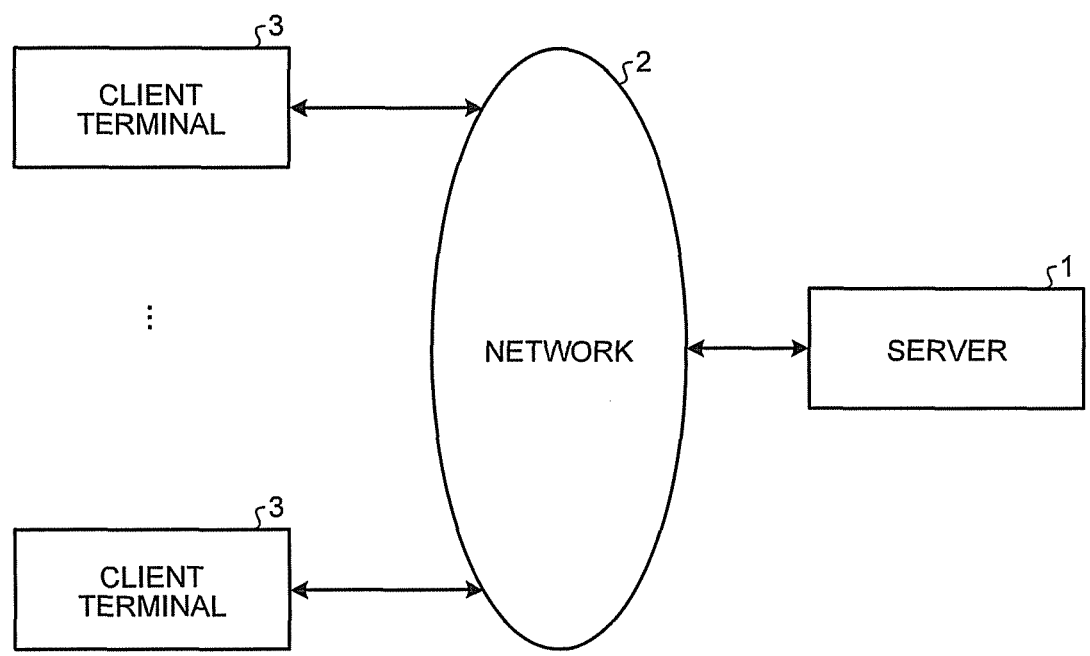
FIG. 1 is a schematic view illustrating a system establishment example of a structured document management system according to a first embodiment.

First, a first embodiment will be described with reference to FIGS. 1 to 12. FIG. 1 is a schematic view illustrating a system establishment example of the structured document management system according to the first embodiment. It is assumed that the structured document management system according to this embodiment is a server-client system in which as illustrated in FIG. 1, a plurality of client computers (hereinafter, referred to as client terminals) 3 is connected to a server computer (hereinafter, referred to as a server) 1 which is a structured document management device via a network 2 such as a local area network (LAN).

Figure 2:
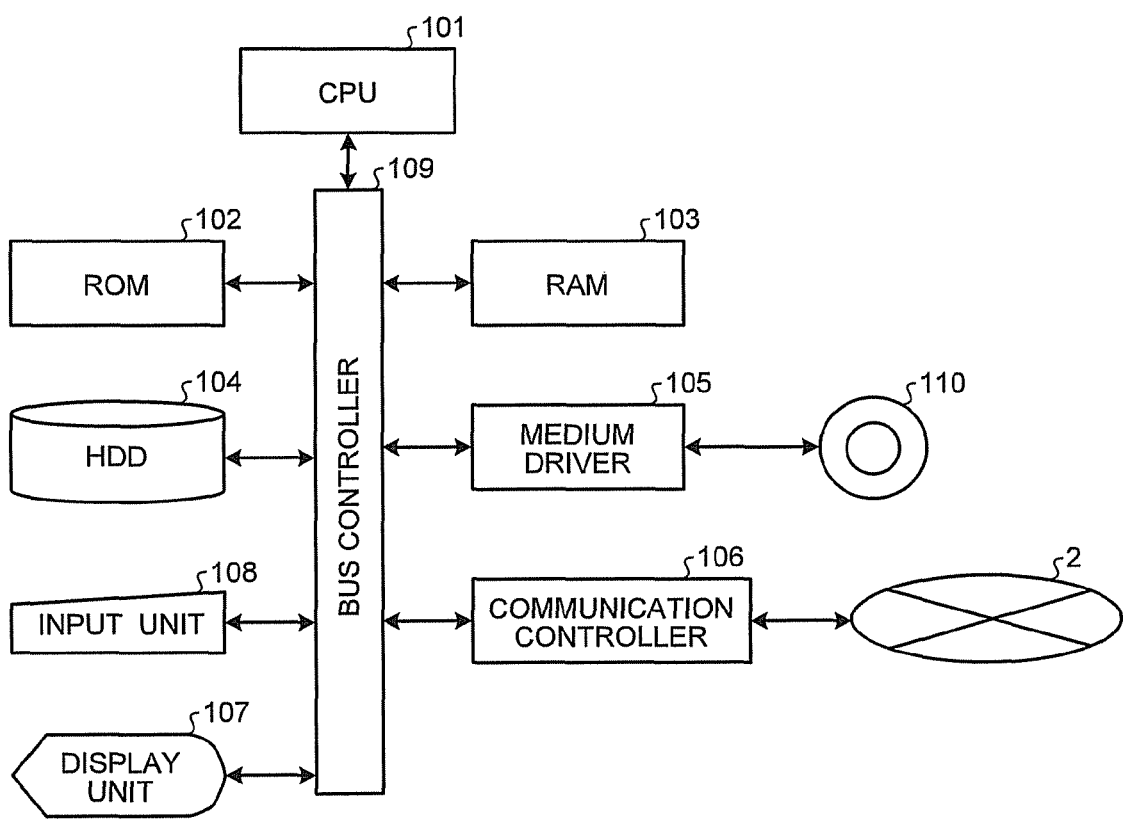
FIG. 2 is a module configuration diagram of a server and a client terminal according to the first embodiment.

FIG. 2 is a module configuration diagram of the server 1 and the client terminal 3. The server 1 and the client terminal 3 have a hardware configuration which uses a general computer, for example. That is, the server 1 and the client terminal 3 include a central processing unit (CPU) 101, a read only memory (ROM) 102, a random access memory (RAM) 103, a hard disk drive (HDD) 104, a medium driver 105, a communication controller 106, a display unit 107, an input unit 108, and a bus controller 109.

The CPU 101 executes various information processes. The ROM 102 is a read only memory that stores a BIOS and the like. The RAM 103 stores various items of data in a rewritable manner. The HDD 104 functions as various databases and stores various programs. The medium driver 105 is a CD-ROM drive for storing information, distributing information to the outside, and obtaining information from the outside using a storage medium 110.

The communication controller 106 is used for transferring information to another external computer via the network 2 by communication. The display unit 107 is a cathode ray tube (CRT) or a liquid crystal display (LCD) that displays the progress, results, and the like of processing to an operator. The input unit 108 is a keyboard or a mouse that allows the operator to input commands, information, and the like to the CPU 101. The data is transmitted and received between these respective components under the control of the bus controller 109.

When the user powers on the server 1 and the client terminal 3, the CPU 101 activates a program called a loader in the ROM 102 to read a program called an operating system (OS), which manages hardware and software of a computer, from the HDD 104 into the RAM 103, and to activate the OS. Such an OS activates a program and reads and stores information according to an operation of the user. As a typical OS, Windows (registered trademark), UNIX (registered trademark), and the like are known. Programs running on such an OS are called application programs. Application programs are not limited to those running on a predetermined OS, and may be those which cause the OS to take over execution of part of various types of processing described below and those which are included as a part of a group of program files that constitutes predetermined application software, an OS, or the like.

Here, the server 1 stores a structured document management program in the HDD 104 as an application program. In this sense, the HDD 104 functions as a storage medium that stores the structured document management program. Moreover, in general, an application program installed in the HDD 104 of the server 1 is provided as a computer program product in a state of being recorded on the storage medium 110 such as media of various schemes, for example, various types of optical disks such as a CD-ROM and a DVD, various types of magneto-optical disks, various types of magnetic disks such as a flexible disk, and semiconductor memories. Thus, the portable storage medium 110 such as an optical information storage medium (for example, a CD-ROM) or a magnetic medium (for example, an FD) can be a storage medium that stores the structured document management program. Further, the structured document management program may be imported, for example, from the outside via the communication controller 106 and installed in the HDD 104.

In the server 1, when the structured document management program running on the OS is activated, the CPU 101 intensively controls the respective components by executing various types of arithmetic processing according to the structured document management program. On the other hand, in the client terminal 3, when an application program running on the OS is activated, the CPU 101 intensively controls the respective components by executing various types of arithmetic processing according to the application program. Among various types of arithmetic processing executed by the CPU 101 of the server 1 and the client terminal 3, processing of the structured document management system according to the embodiment will be described below.

Figure 3:
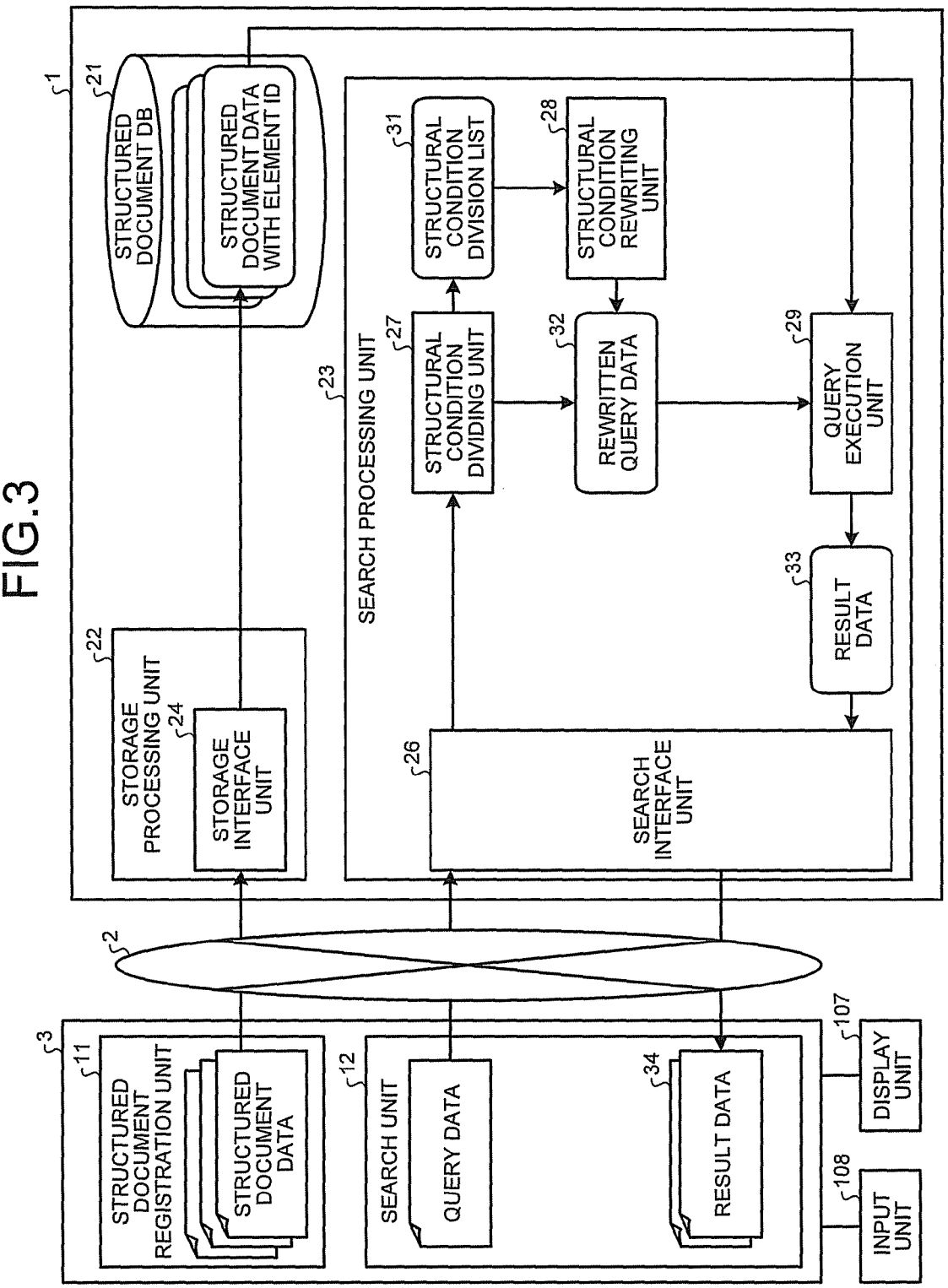
FIG. 3 is a block diagram illustrating a general configuration of the server and the client terminal according to the first embodiment.

FIG. 3 is a block diagram illustrating a general configuration of the server 1 and the client terminal 3 according to the first embodiment. As illustrated in FIG. 3, the client terminal 3 includes a structured document registration unit 11 and a search unit 12 as functional configurations that are realized by the application program.

The structured document registration unit 11 registers structured document data input from the input unit 108 and structured document data stored in advance in the HDD 104 of the client terminal 3 in a structured document database (structured document DB) 21 of the server 1, which will be described below. The structured document registration unit 11 sends a storage request to the server 1 together with the structured document data to be registered.

FIG. 4 illustrates an example of structured document data that is registered in the structured document DB 21. Extensible Markup Language (XML) is a typical language for describing the structured document data. The two items of structured document data D1 and D2 illustrated in FIG. 4 are described in XML. In XML, individual parts that constitute a document structure are referred to as "elements", and the elements are described using tags. Specifically, one element is expressed in such a way that data is surrounded by two tags which include a tag (start-tag) that indicates the start of an element and a tag (end-tag) that indicates the end of the element. Text data surrounded by the start-tag and the end-tag is a text element included in one element that is represented by the start-tag and the end-tag.

In the example illustrated in FIG. 4, a structured document D1 has a root element which is surrounded by <book> tags and is present under a document element. The <book> element includes a plurality of child elements that is surrounded by <title>, <author>, and <publisher> tags. The <title> element includes a text element such as "Data On The Web".

The <book> element includes two <author> elements, the two <author> elements appear after the <title> element, and a <publisher> element appears subsequently. Each <author> element includes two child elements that appear in the order of <last> and <first>.

A structured document D2 has a root element <book> similarly to the structured document D1, and the <book> element has a child element <editor> rather than the <author> element unlike the structured document D1. The <editor> element includes two child elements that appear in the order of <last> and <first> similarly to the <author> element.

Returning to FIG. 3, the search unit 12 creates query data that describes search criteria or the like for searching for desired data from the structured document DB 21 according to an instruction of the user input from the input unit 108 and sends a search request including the query data to the server 1. Moreover, the search unit 12 receives result data corresponding to the search request sent from the server 1 and displays the result data on the display unit 107.

On the other hand, the server 1 includes a storage processing unit 22 and a search processing unit 23 as functional configurations that are realized by the structured document management program. Moreover, the server 1 includes the structured document DB 21 which uses a storage device such as the HDD 104.

The storage processing unit 22 performs a process of receiving a storage request from the client terminal 3 and storing the structured document data sent from the client terminal 3 in the structured document DB 21. The storage processing unit 22 includes a storage interface unit 24.

The storage interface unit 24 (structured document receiving unit) receives the input of structured document data and stores the structured document data in the structured document DB 21.

The search processing unit 23 performs a process of receiving a search request from the client terminal 3, finding data that meets conditions designated by query data from the structured document DB 21, and returning the found data to the client terminal 3 as result data. The search processing unit 23 includes a search interface unit 26, a structural condition dividing unit 27, a structural condition rewriting unit 28, and a query execution unit 29.

The search interface unit 26 (query data receiving unit) receives the input of query data and calls the structural condition dividing unit 27 in order to obtain result data that meets the condition designated by the received query data.

The structural condition dividing unit 27 parses the syntax of query data (hereinafter, referred to as input query data) which is sent from the client terminal 3 and input via the search interface unit 26, divides the input query data into structural condition portions (hereinafter, referred to as a "structural condition division list 31") that indicate conditions that designate a hierarchical relation of the logical structure of the structured document data, and extracts the structural condition division list 31.

The structural condition rewriting unit 28 rewrites structural conditions other than a descendant structural condition in the structural condition division list 31 output by the structural condition dividing unit 27 by a combination of join operations with the descendant structural condition. Details of the rewriting will be described below. The rewritten query data is simply joined with the other query data that is not rewritten and output as final rewritten query data 32.

The query execution unit is configured to execute the rewritten query data 32 output from the structural condition rewriting unit 28 with respect to the data set of the structured document data stored in the structured document DB 21 to obtain result data 33 and outputs the result data 33.

The search interface unit 26 returns the result data 33 output from the query execution unit 29 to the client terminal 3 as search result data 34.

Figures 5, 6:
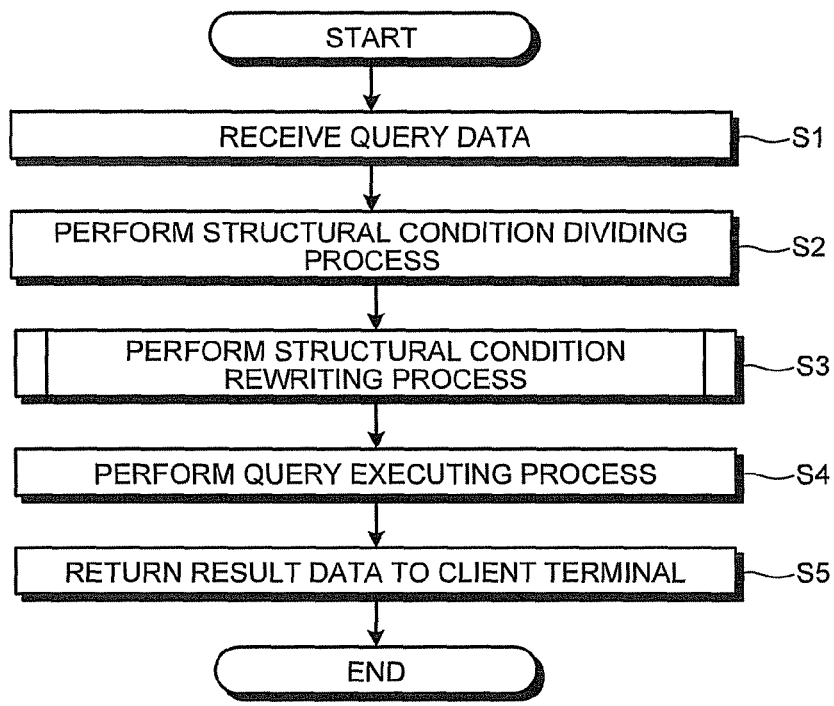
FIG. 5 is an explanatory diagram illustrating an example of query data according to the first embodiment.
FIG. 6 is a flowchart illustrating the flow of a search process of a search processing unit according to the first embodiment.

FIG. 5 is an explanatory diagram illustrating an example of query data. In XML, a query language called XQuery is proposed by the W3C, and the query data illustrated in FIG. 5 is pursuant to a query description method based on the XQuery. FIG. 5 illustrates query data Q1 that intends to "Find a list of authors cited before an author whose last name is 'Suciu'" and that includes a condition (structural condition) for the following complex hierarchical structures. The structural condition begins with a character "/" within the query data, a character string called "axis" that identifies the type of the structural condition and the processing content is filled between "/" and a character string "::", and an element designation character string that indicates an element name or an element type is filled to the right of the character string "::". The element designation character string is a character string that begins with a character next to "::" and ends before a character "/" that indicates the start of the next structural condition or a character string that indicates a type other than the structural condition.

The query data Q1 has such a structure that a "book" element is located at the top layer of each structured document data of the structured document DB 21, an "author" element is located immediately below the "book" element, a "last" element is located immediately below the "author" element, a text element having the value of "Suciu" is located immediately below the "last" element, and an "author" element is located anywhere on the higher layer of the text element. The query data Q1 returns a list of "author" elements of which the appearing order is earlier in the structured document than the sibling elements having the same parent element as the "author" element.

FIG. 6 is a flowchart illustrating the flow of a search process of the search processing unit 23 of the server 1. First, the search interface unit 26 receives the input of query data sent from the client terminal 3 via the network 2 (step S1).

Subsequently, the structural condition dividing unit 27 performs a process of dividing input query data into structural condition portions (step S2).

FIG. 7 illustrates the results obtained by the structural condition dividing unit 27 dividing the query data illustrated in FIG. 5 into structural conditions, in which the query data is divided into seven structural conditions [1] to [7]. The condition [1] is a structural condition that starts with the starting character "/" of query data and ends before the next "/". The axis is "child", and an element designation character string is "book". Similarly, the conditions [2], [3], and [4] have axes "child" and have element designation character strings "author", "last", and "text( )", respectively. The "text( )" is not an element name but is a character string that designates a text element. The condition [5] is not a structural condition but is a refining condition that designates to take those elements of which the character string value is "Suciu" among the output results of the condition [5]. The refining condition [5] may be divided so as to be grouped together with the structural condition [4]. The condition [6] is a structural condition of which the axis name is "ancestor-or-self" and the element designation character string is "author". The condition [7] is a structural condition of which the axis name is "preceding-sibling" and the element designation character string is "author".

FIG. 8 is a table illustrating the type of a structural condition and the processing content. The table illustrated in FIG. 8 includes three items of "axis name", a "structural condition type", and "processing content". The "axis name" is used for uniquely determining the processing content of a structural condition and is used as a query. The "structural condition type" indicates the category of each axis, that is, whether the structural condition belongs to a descendant structural condition that designates a path from a higher layer to a lower layer, an ancestor structural condition that designates a path from a lower layer to a higher layer, a sibling structural condition that designates an antero-posterior relation on the same layer, or an order structural condition that designates an order relation of elements included in XML data within the structural condition. The "processing content" specifically describes an acquisition target of the structural condition of each axis.

Returning to FIG. 6, when the structural condition division process of the structural condition dividing unit 27 is completed, the structural condition rewriting unit 28 performs a rewriting process on the structural conditions divided by the structural condition dividing unit 27 (step S3). Elements (in the example of FIG. 7, the condition [5]) other than structural conditions are not rewritten. An example of the rewriting process of the structural condition rewriting unit 28 will be described with reference to FIG. 9.

FIG. 9 is a flowchart illustrating the flow of a structural condition rewriting process. First, the structural condition rewriting unit 28 acquires the starting element from the list of divided structural conditions given as an input and removes the same from the list after completing the acquisition (step S21).

Subsequently, the structural condition rewriting unit 28 checks the element acquired in step S21 to determine whether the element is a structural condition or another condition (step S22). The structural condition is an element which has the axis name defined in FIG. 8, and in the example of FIG. 7, only the condition [5] is not the structural condition. When the element is determined to be a structural condition (Yes in step S22), the structural condition rewriting unit 28 uses an element designation character string in the structural condition as a rewritten parameter X (step S23). Subsequently, the structural condition rewriting unit 28 acquires the structural condition type in FIG. 8 from the axis name of the structural condition included in the acquired element (step S24). This table is stored in advance in the HDD 104 or the like, for example. Subsequently, the structural condition rewriting unit 28 determines whether the acquired structural condition type is any one of an ancestor structural condition, a sibling structural condition, and an order structural condition (step S25).

When the structural condition type is any one of the ancestor structural condition, the sibling structural condition, and the order structural condition (Yes in step S25), the structural condition rewriting unit 28 acquires a rewritten base query Y corresponding to the structural condition type from the table illustrated in FIG. 10 (step S28).

FIG. 10 is an example of a rewriting rule of each axis used in the structural condition rewriting process. The table illustrated in FIG. 10 includes items of "number", "axis name", "structural condition type", "rewritten base query", and "rewritten parameter". The "number" is an identification number allocated to each rewriting rule. The "axis name" and the "structural condition type" are the same as those of FIG. 8. The "rewritten base query" is a basic template of a rewritten query for each structural condition type. [Parameter A] and [Parameter B] are changeable parameter portions of the rewritten base query. Here, the "rewritten base query" assigns "." that indicates the input of a structural condition to a variable $1 on the first line and performs processing using the variable $1 as a starting point. Thus, the rewritten query accepts only the elements of a structured document which is refined by the refining condition performed earlier than the structural condition as its input. Moreover, a function "root" appearing in the "rewritten base query" is a function that acquires a starting element of the structured document including the elements accepted as the input. The query is rewritten in such a manner that it returns to the starting element and then retraces from the higher level to the lower level. The "rewritten parameter" is a value of each axis assigned to [Parameter B] of the "rewritten base query". This table is stored in advance in the HDD 104 or the like, for example. The content of the rewritten base query Y will be described later.

The rewritten base query corresponding to the ancestor structural condition involves obtaining a variable $2 that stores all nodes of which the tag name is [Parameter A] in an XML document that stores the nodes of a variable $1 that stores an input node. Moreover, the rewritten base query involves obtaining a variable $3 that stores all nodes that meet the structural condition of [Parameter B] with respect to each of the nodes stored in the variable $2 and returning the variable $2 by determining that the variable $2 is the node that meets the ancestor structural condition when the same node as the node stored in the variable $1 is present in the variable $3. This means that when all nodes of which the tag name is [Parameter A] are found within a document in which an input node is present, and in a case where the input node is present in a child (descendant) node of the node A, the node A is a parent (ancestor) node of the input node.

Moreover, a base query corresponding to the sibling structural condition is an expression that obtains a variable $2 that stores all nodes of which the tag name is [Parameter A] in an XML document that stores the node of a variable $1 that stores an input node, obtains a variable $3 that stores all nodes in an XML document that stores each of the nodes stored in the variable $2, obtains a variable $4 that stores a child node of each of the nodes stored in the variable $3, stores the node of the variable $4 as a variable $5 only when the node of the variable $2 is present in the variable $4, and returns the variable $2 by determining that the variable $2 is a node that meets the sibling structural condition when the order relation of the variables $2 and $1 meets [Parameter B], and the node of the variable $1 is present in the variable $5. That is, this query involves finding all nodes A of which the tag name is [Parameter A] in a document in which an input node is present, acquiring a set B of nodes whose parent is the same as that of the node A, and determining that the node A is a preceding (following) sibling of the input node when the input node is included in the node set B, and the appearance order of the node A is earlier (later) than the input node.

Moreover, a base query that obtains a node that meets a preceding condition of the order structural condition will be described. This query is an expression that obtains a variable $2 that stores all nodes of which the tag name is [Parameter A] in an XML document that stores the node of a variable $1 that stores an input node, obtains a variable $3 that stores a descendant node of each of the nodes stored in the variable $2, and returns the variable $2 by determining that the variable $2 is a node that meets the condition when the order of the variable $2 is earlier than the variable $1, and the node of the variable $3 is not present in the variable $1. That is, this query involves finding all nodes A of which the tag name is [Parameter A] in a document in which an input node is present and acquiring a descendant node set B of the node A. Moreover, this query involves determining that the node A meets the preceding condition for the input node when the order of the node A is earlier than the input node, and the input node is not included in the descendant node set B of the node A.

Moreover, a base query that obtains a node that meets a following condition of the order structural condition will be described. This query is an expression that obtains a variable $2 that stores all nodes of which the tag name is [Parameter A] in an XML document that stores the node of a variable $1 that stores an input node, obtains a variable $3 that stores all descendant nodes of the variable $1, and returns the value of the variable $2 by determining that the variable $2 is a node that meets the following condition when the order of the variable $2 is later than the variable $1, and the node of the variable $3 is not present in the variable $2. That is, this query involves finding all nodes A of which the tag name is [Parameter A] in a document in which an input node is present and acquiring a descendant node set B of the input node. Moreover, this query involves determining that the node A meets the following condition for the input node when the order of the node A is later than the input node, and the node A is not included in the descendant node set B of the input node.

Subsequently, the structural condition rewriting unit 28 rewrites the [Parameter A] portion of the rewritten base query Y into a rewritten parameter X (step S29). Subsequently, the structural condition rewriting unit 28 acquires a rewritten parameter Z corresponding to the axis type from the table illustrated in FIG. 10 (step S30). Subsequently, the structural condition rewriting unit 28 rewrites the [Parameter B] portion of the rewritten base query Y into the rewritten parameter Z (step S31). Subsequently, the structural condition rewriting unit 28 adds the rewritten result to the rewritten query (step S26).

Subsequently, the structural condition rewriting unit 28 determines whether a division list is empty (step S27). When the division list is empty (Yes in step S27), that is, when the element removed in step S21 is the last element, the structural condition rewriting unit 28 ends the structural condition rewriting process and outputs the rewritten query.

On the other hand, when it is determined in step S22 that the element is not the structural condition (No in step S22), the structural condition rewriting unit 28 adds the element to the rewritten query as it is without rewriting the element (step S26). Subsequently, the flow proceeds to step S27, and the same processing is repeated.

On the other hand, when it is determined in step S27 that the division list is not empty (No in step S27), the flow proceeds to step S21, and the same processing is repeated.

Here, an overview of a general structural condition rewriting process when the process is performed using the structural condition division result illustrated in FIG. 7 will be described with reference to FIGS. 9 to 11.

First, the structural condition rewriting unit 28 receives a division list that includes seven elements [1] to [7] of FIG. 7 as an input, extracts the first element [1], and removes the element [1] from the list (step S21). Subsequently, the structural condition rewriting unit 28 determines whether the element [1] is a structural condition and uses an element designation character string "book" as a rewritten parameter X since the element [1] is a structural condition (steps S22 and S23). Subsequently, the structural condition rewriting unit 28 acquires a descendant structural condition from the table of FIG. 8 as a structural condition type since the axis of the element [1] is "child" (step S24). Subsequently, since the element [1] is none of the ancestor structural condition, the sibling structural condition, and the order structural condition, the structural condition rewriting unit 28 adds the element [1] to the rewritten query, and the rewritten query becomes "/child::book" (steps S25 and S26). Subsequently, since the division list is not empty, the structural condition rewriting unit 28 acquires the starting element [2] of the next list and removes the element [2] from the list (steps S27 and S21).

Since the elements [2], [3], and [4] of the division list have the same axes "child" as the element [1], the same processes as steps S22 to S27 are repeated. As a result, the rewritten query becomes "/child::book/child::author::child::last/child::text( )".

Subsequently, the structural condition rewriting unit 28 acquires a starting element [5] of the division list again and removes the element [5] from the list (step S21). Subsequently, since the element is not the structural condition, the structural condition rewriting unit 28 adds "[.="Suciu"]" which is the element [5] to the rewritten query (steps S22 and S26).

Subsequently, the structural condition rewriting unit 28 extracts the starting element [6] of the division list and removes the element [6] from the list (step S21). Subsequently, since the element is the structural condition, the structural condition rewriting unit 28 assigns "author" to the rewritten parameter X and acquires an ancestor structural condition from the axis type "ancestor-or-self" as a structural condition type (steps S22, S23, and S24). Subsequently, since the element is the ancestor structural condition, the structural condition rewriting unit 28 acquires a rewritten base query Y corresponding to the structural condition type from FIG. 10 (steps S25 and S28). Subsequently, the structural condition rewriting unit 28 rewrites the [Parameter A] portion of the rewritten base query Y into "author" of the rewritten parameter X (step S29). Subsequently, the structural condition rewriting unit 28 acquires "descendant-or-self" from FIG. 10 as the rewritten parameter Z corresponding to the axis type and rewrites the [Parameter B] of the rewritten base query Y into the rewritten parameter Z (steps S30 and S31). Moreover, the structural condition rewriting unit 28 adds the rewritten result to the rewritten query (step S26). Subsequently, since the division list is not empty, the structural condition rewriting unit 28 extracts the element [7] from the starting element of the list and removes the same from the list (steps S27 and S21).

Subsequently, since the element [7] is the structural condition, the structural condition rewriting unit 28 assigns "author" to the rewritten parameter X and acquires a sibling structural condition from the axis type "preceding-sibling" as the structural condition type (steps S22, S23, and S24). Since the element [7] is a sibling structural condition, the structural condition rewriting unit 28 acquires the rewritten base query Y corresponding to the structural condition type from FIG. 10 (steps S25 and S28). Subsequently, the structural condition rewriting unit 28 rewrites the [Parameter A] portion of the rewritten base query Y into "author" of the rewritten parameter X (step S29). Subsequently, the structural condition rewriting unit 28 acquires "following-sibling" from FIG. 10 as the rewritten parameter Z corresponding to the axis type and rewrites the [Parameter B] of the rewritten base query Y into the rewritten parameter Z (steps S30 and S31). The structural condition rewriting unit 28 adds the rewritten result to the rewritten query (step S26). Subsequently, since the list is empty, the structural condition rewriting unit 28 ends the structural condition rewriting process (step S27).

FIG. 11 illustrates the results of the rewritten query when the structural condition rewriting process is performed using the structural condition division result illustrated in FIG. 7. The structural conditions corresponding to the elements [6] and [7] are simply rewritten into two blocks that begin with ( ). Since the input of the rewritten portion of the element [6] becomes the operation results of the elements [1] to [5], when the structured document set is refined by the conditions of the elements [1] to [5], the rewriting result of the element [6] is applied to only the target structured document structure. Similarly, the rewriting result of the element [7] is applied to only the structured document set that is refined by the element [6].

When the structural condition rewriting process of the structural condition rewriting unit 28 ends, the rewritten query is output as XQuery. Subsequently, as illustrated in FIG. 6, the query execution unit 29 executes the rewritten XQuery (step S4). Since the rewritten XQuery maintains the form of XQuery, the query executing process can be executed by an optional XQuery processing system.

When the query executing process of the query execution unit 29 ends, finally, the search interface unit 26 returns the output of the query execution unit 29 to the client terminal 3 as result data and ends the process (step S5).

FIG. 12 illustrates the results of execution of the rewritten XQuery illustrated in FIG. 5 with respect to the structured documents D1 and D2 illustrated in FIG. 4. According to the original intention "To find a list of authors cited before an author whose last name is 'Suciu'", the "author" element in which a text element immediately below the "last" element in the structured document D1 appears earlier than the "author" element which is the ancestor element of "Suciu" meets the conditions and is thus output. Since the structured document D2 does not have the element "author", the structured document D2 is removed from the target structured document structure at a stage where the structural condition corresponding to the element [2] of FIG. 7 is checked.

As described by way of specific examples, according to this embodiment, the server 1 stores the structured document data in the structured document DB 21. Moreover, when searching structured document data, the server 1 parses the syntax of the input query data from the client terminal 3, divides the input query data into structural conditions that designate the hierarchical structure of the logical structure of the structured document data, and rewrites a structural condition using a join condition with a descendant structural condition when the divided structural condition is one other than the descendant structural condition that designates the path from a higher layer to a lower layer. Thus, even when the input query data includes a structural condition other than the descendant structural condition, by processing the input query data by a structure matching process and a joining process with only a simple descendant structural condition, it is possible to accelerate the structure matching process.

Moreover, in the above embodiment, when structural conditions other than the descendant structural condition are rewritten, since only the corresponding structural condition portion is rewritten, the structural condition can be rewritten by a simple partial substitution without affecting the other portions of non-corresponding query data. Further, in the specific examples, when the structural condition is rewritten into a joining process with a descendant structural condition, the structural condition is rewritten so that the input of the rewritten descendant structural condition is applied to only the structured documents obtained by the previous processing of the query data. In this way, since rather than applying the rewritten structural condition to the entire structured document set, the descendant structural condition only needs to be applied to the structured document set which has been refined by the previous process, it is possible to accelerate the search.

In the specific examples, a case where "preceding-sibling" and "ancestor-or-self" are included in the input query data as the sibling structural condition and the ancestor structural condition has been described. However, the same process as the specific examples can be performed when other conditions of the sibling structural condition and the start signal, for example, "following-sibling", "ancestor", "parent", and the like are included, and the order structural condition "preceding" and "following" is included.

Second Embodiment

Next, a second embodiment will be described. This embodiment is an example in which when a structural condition other than the descendant structural condition is rewritten, the structural condition is rewritten in combination with the preceding and subsequent structural conditions rather than rewriting only the element. In the following description, the same configurations as those of the first embodiment will be denoted by the same reference numerals, and redundant description thereof will not be provided.

Figure 13:
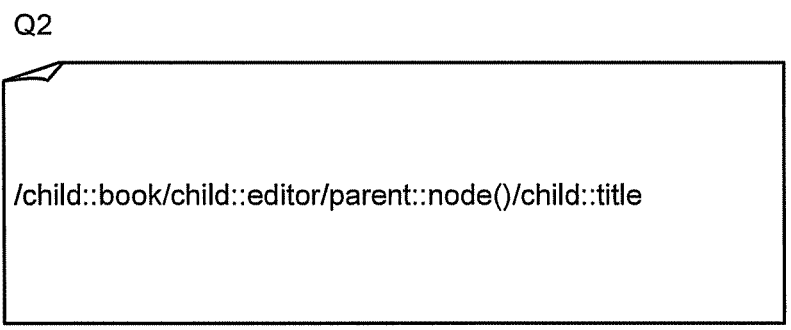
FIG. 13 is an explanatory diagram illustrating an example of query data according to a second embodiment.

FIG. 13 is an explanatory diagram illustrating an example of query data used in this embodiment. The query data Q2 illustrated in FIG. 13 is described in XQuery similarly to the query data Q1 described in the first embodiment. The query of FIG. 13 intends to "find the title of a structured document of which the author name is described under the 'editor' element" and includes a condition (structural condition) for the following complex hierarchical structure.

The query data Q2 has such a structure that a "book" element is located at the top layer of each structured document data of the structured document DB 21, and the "book" element has an "editor" element therein and returns a list of "title" elements located immediately below an element which is located one layer above the "editor" element.

In the query data Q2, "/child::editor" involves tracing one layer downward from the "book" element, a structural condition "/parent::node( )" involves returning to the original element, and "/child::title" involves tracing the elements located one layer below. In this manner, it is checked that the "editor" element is located under the "book" element, and then, the "title" element is output.

The flow of the rewriting process of the search processing unit 23 according to this embodiment is the same as that of the first embodiment illustrated in FIG. 6. However, in this embodiment, during the structural condition rewriting process of step S3, the structural condition rewriting process is performed under different rewriting rules.

Figure 14:
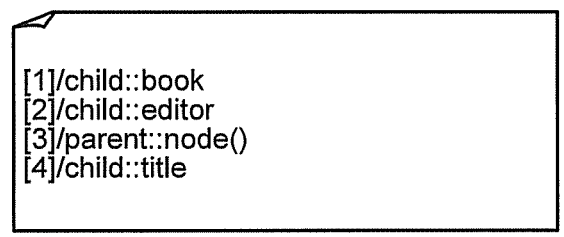
FIG. 14 is an explanatory diagram illustrating the results of a structural condition dividing process on the query data according to the second embodiment.

FIG. 14 illustrates the results obtained by the structural condition dividing unit 27 dividing the query data illustrated in FIG. 13 into elements, in which the query data is divided into four elements [1] to [4]. The element [1] is a structural condition that starts with the starting character "/" of query data and ends before the next "/". The axis is "child", and an element designation character string is "book". Similarly, the elements [2] and [4] have axes "child" and have element designation character strings "editor" and "title", respectively. The element [3] is a structural condition of which the axis name is "parent" and the element designation character string is "node( )". The "node( )" is not an element name but is a character string that designates an element of an optional type.

Figure 15:
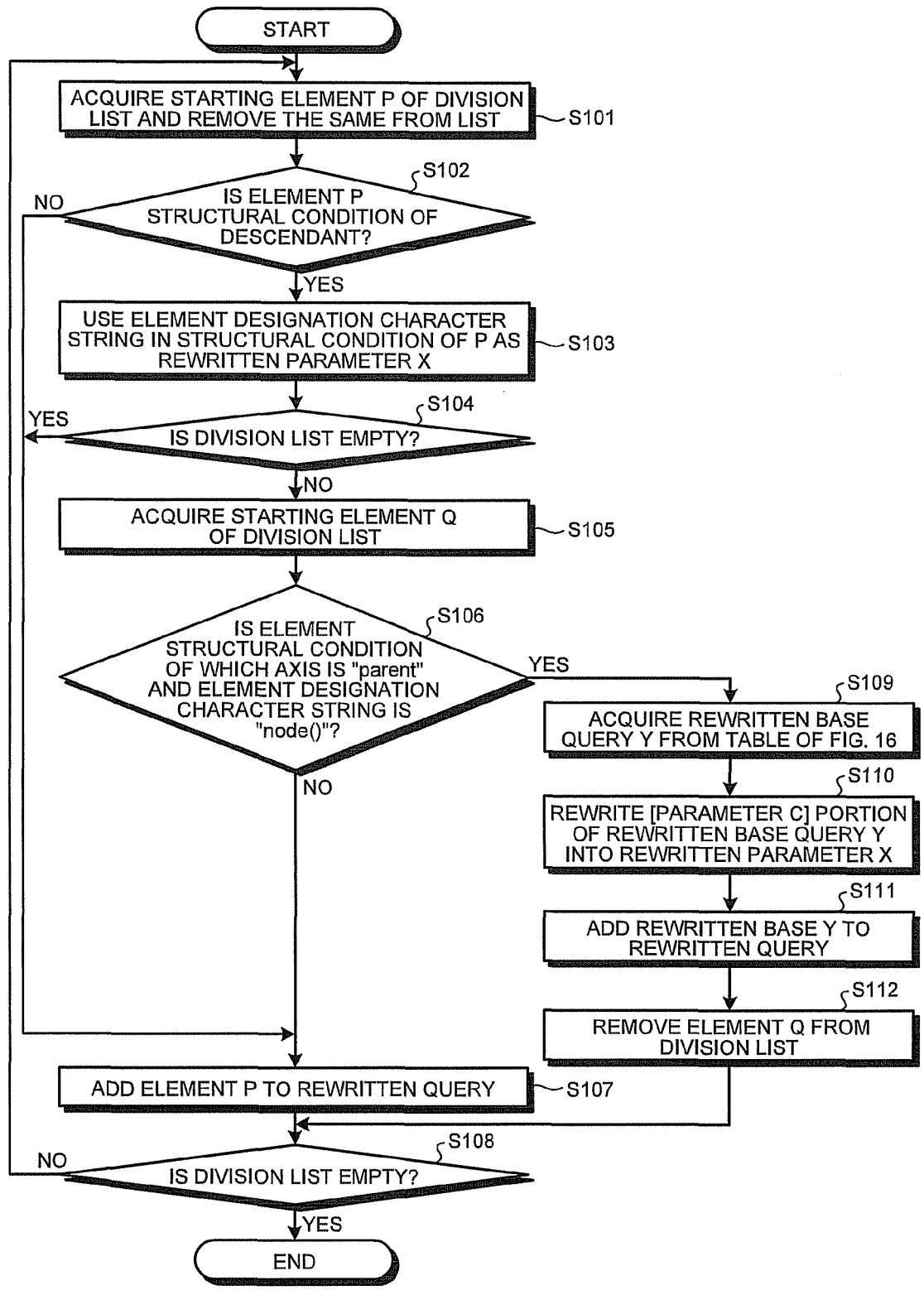
FIG. 15 is a flowchart illustrating the flow of a structural condition rewriting process according to the second embodiment.

FIG. 15 is a flowchart illustrating the flow of the structural condition rewriting process according to this embodiment. In the flowchart of FIG. 15, the process of step S101 is the same as step S21 described in the first embodiment, and description thereof will not be provided.

Subsequently to the process of step S101, the structural condition rewriting unit 28 determines whether the axis name of an element P acquired in step S101 is "child" which is one type of the descendant structural condition (step S102).

When it is determined that the axis name of the element P is "child" which is one type of the descendant structural condition (Yes in step S102), the structural condition rewriting unit 28 uses the element designation character string in the structural condition as the rewritten parameter X (step S103). Subsequently, the structural condition rewriting unit 28 determines whether the division list is empty (step S104).

When it is determined that the division list is not empty (No in step S104), the structural condition rewriting unit 28 acquires the starting element Q of the division list (step S105). Subsequently, the structural condition rewriting unit 28 determines whether the element Q is a structural condition of which the axis value is "parent" and the element designation character string is "node( )" (step S106).

When it is determined that the element Q is a structural condition of which the axis value is "parent" and the element designation character string is "node( )" (Yes in step S106), the structural condition rewriting unit 28 acquires the rewritten base query Y from the table illustrated in FIG. 16 (step S109). FIG. 16 is an example of the rewriting rules of two successive structural conditions used in the structural condition rewriting process. FIG. 16 has items of "number", "starting axis name", "subsequent axis name", "subsequent element character string", and "rewritten base query". The "number" is an identification number allocated to each rewriting rule. In order to simplify the description, only one rewriting rule is illustrated. The "starting axis name" is an axis name of a structural condition that is checked first. The "subsequent axis name" is an axis name of a structural condition subsequent to the starting structural condition. The "subsequent element character string" is an element character string of the structural condition subsequent to the starting structural condition. The "rewritten base query" is a basic template of a rewritten query for each rule. [Parameter C] is a changeable parameter portion of the rewritten base query. According to the rule of FIG. 16, although the condition requires two successive structural conditions, the rewritten base query can be transformed into a simple form as compared to the rewritten base query of FIG. 10.

Subsequently, the structural condition rewriting unit 28 rewrites the [Parameter C] portion of the rewritten base query Y into the rewritten parameter X (step S110). Subsequently, the structural condition rewriting unit 28 adds the rewritten result to the rewritten query (step S111). Subsequently, the structural condition rewriting unit 28 removes the element Q from the division list (step S112).

Subsequently, the structural condition rewriting unit 28 determines whether the division list is empty (step S108). When it is determined that the division list is empty (Yes in step S108), the structural condition rewriting unit 28 ends the structural condition rewriting process and outputs the rewritten query.

On the other hand, when it is determined that the axis name of the element P is not "child" which is one type of the descendant structural condition (No in step S102), the element P is added to the rewritten query as it is without rewriting the element P (step S107). Subsequently, the flow proceeds to step S108, and the same process is repeated.

On the other hand, when the division list is empty (Yes in step S104), the flow proceeds to step S107, and the same process is repeated.

On the other hand, when it is determined that the element Q is not the structural condition of which the axis value is "parent" and the element designation character string is "node( )" (No in step S106), the flow proceeds to step S107, and the same process is repeated.

Here, an overview of a general structural condition rewriting process when the process is performed using the structural condition division result illustrated in FIG. 14 will be described.

First, the structural condition rewriting unit 28 receives a division list that includes four elements [1] to [4] of FIG. 14 as an input, extracts the first element [1], and removes the element [1] from the list (step S101). Subsequently, the structural condition rewriting unit 28 determines whether the axis name of the element [1] is a structural condition of "child", and uses the element designation character string "book" as the rewritten parameter X since the condition is met (steps S102 and S103).

Subsequently, the structural condition rewriting unit 28 determines whether the division list is empty, and acquires the element [2] as a starting element Q since the division list is not empty (steps S104 and S105). Subsequently, since the axis name of the element Q is not "parent", the element [1] which is the element P is added to the rewritten query (steps S106 and S107). Subsequently, since the division list is not empty, the structural condition rewriting unit 28 acquires the starting element [2] of the list as the element P (steps S108 and S101). Since the axis name of the element [2] which is the element P is the structural condition of "child", the element designation character string "editor" is used as the rewritten parameter X (steps S102 and S103).

Subsequently, the structural condition rewriting unit 28 determines whether the division list is empty and acquires the element [3] as the starting element Q since the division list is not empty (steps S104 and S105). Subsequently, since the axis name of the element Q is "parent" and the element character string is a structural condition of "node( )", the rewritten base query Y is acquired from the table of FIG. 16 (steps S106 and S109). Subsequently, the structural condition rewriting unit 28 rewrites the [Parameter C] portion of the rewritten base query Y into "editor" which is the rewritten parameter X (step S110). Subsequently, the structural condition rewriting unit 28 adds the rewritten base query Y to the rewritten query and removes the element Q from the division list (steps S111 and S112).

Subsequently, since the division list is not empty, the structural condition rewriting unit 28 acquires the starting element [4] of the list as the element P (steps S108 and S101). Since the axis name of the element [4] which is the element P is a structural condition of "child", the structural condition rewriting unit 28 uses the element designation character string "title" as the rewritten parameter X (steps S102 and S103). Subsequently, since the division list is empty, the structural condition rewriting unit 28 adds the element [4] which is the element P to the rewritten query (steps S104 and S107).

Subsequently, since the division list is empty, the structural condition rewriting unit 28 ends the structural condition rewriting process (step S108). FIG. 17 illustrates the results of the rewritten query when the structural condition rewriting process is performed using the structural condition division result illustrated in FIG. 14. The structural conditions corresponding to the elements [2] and [3] are simply rewritten into one block that begins with ( ) by one rewriting rule.

When the structural condition rewriting process of the structural condition rewriting unit 28 ends, the structural condition rewriting unit 28 outputs the rewritten)(Query. After that, similarly to the first embodiment, the query execution unit 29 executes the rewritten XQuery and outputs search results (step S4).

When the query executing process of the query execution unit 29 ends, finally, the search interface unit 26 returns the output of the query execution unit 29 to the client terminal 3 as result data (step S5).

Figure 18:
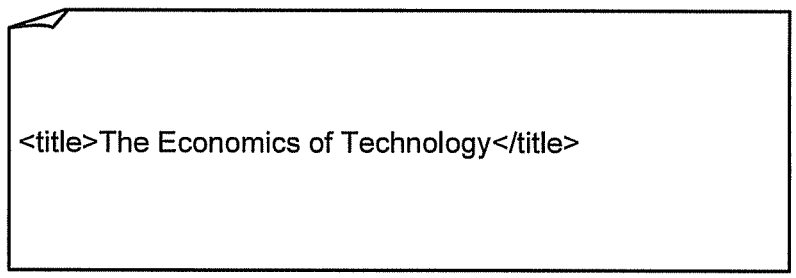
FIG. 18 is an explanatory diagram illustrating result data of query data according to the second embodiment.

FIG. 18 illustrates the results of execution of the rewritten XQuery illustrated in FIG. 13 with respect to the structured documents D1 and D2 illustrated in FIG. 4. According to the original intention of the XQuery "Find the title of a structured document of which the author name is described under the 'editor' element", since as for the structured document D1, the element name that indicates an author name is not "editor" but "author", the title is not output. On the other hand, since as for the structured document D2, the element name that indicates an author name is "editor", the "title" element which is a sibling element is output.

As described by way of specific examples, according to this embodiment, when a structural condition other than the descendant structural condition is rewritten, the structural condition is rewritten in combination with other previous and subsequent structural conditions, whereby simpler rewritten results are obtained than only the corresponding structural condition is rewritten only.

The function of the server 1 according to the embodiments described above is realized when the CPU 101 which is an arithmetic unit of a computer, for example, executes a structured document management program implemented as an application program.

The structured document management program executed by the server 1 according to the embodiments is provided in a state of being recorded in the computer-readable storage medium 110 such as a CD-ROM, a flexible disk (FD), a CD-R, or a digital versatile disc (DVD) as an installable or executable file, for example.

Further, the structured document management program executed by the server 1 according to the embodiments may be provided by storing the same on a computer that is connected to the network 2 such as the Internet and downloading the same via the network 2. Moreover, the structured document management program executed by the server 1 according to the embodiments may be provided or distributed via the network 2 such as the Internet. Furthermore, the structured document management program executed by the server 1 according to the embodiments may be provided by being incorporated into the ROM 102 or the like.

The structured document management program executed by the server 1 according to the embodiments has a module configuration that includes the storage interface unit 24, the search interface unit 26, the structural condition dividing unit 27, the structural condition rewriting unit 28, the query execution unit 29, and the like. As an actual hardware, when the CPU (processor) 101 reads the structured document management program from the HDD 104 or the like and executes the same, the respective units are loaded onto a main storage device (for example, the RAM 103), and the storage interface unit 24, the search interface unit 26, the structural condition dividing unit 27, the structural condition rewriting unit 28, the query execution unit 29, and the likes are generated on the main storage device.

According to the structured document management system according to at least one of the embodiments, since the input query data is changed to simple structural conditions and a structure matching process is executed, even when the input query data includes complex structural conditions, it is possible to accelerate the structure matching process and to accelerate search based on the query data that includes complex structural conditions. Moreover, since only the corresponding structural condition portions of the input query data are rewritten, it is possible to simplify the configuration. Further, when the structural condition is rewritten, the structural condition is rewritten so that the input of the rewritten descendant structural condition is applied to only the structured documents obtained by the previous processing of the query data. In this way, since rather than applying the rewritten structural condition to the entire structured document set, the descendant structural condition only needs to be applied to the structured document set which has been refined by the previous process, it is possible to accelerate the search.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structured document management device, comprising:
  a processor; and
  a memory that stores instructions that when executed by the processor perform operations, comprising:
    receiving an input of query data for searching a structured document set having a layered logical structure,
    dividing the query data into elements to extract structural conditions from the elements,
    rewriting the query data based on a joining process with a descendant structural condition to obtain rewritten query data, the descendent structural condition designating a path from a higher layer to a lower layer, and searching the structured document set based on the rewritten query data, wherein the rewriting includes replacing only another structural condition than the descendant structural condition among the extracted structural conditions with the joining process with the descendant structural condition without affecting other portions of the query data except for the other structural condition to obtain the rewritten query data, and the searching includes searching the structured document set based on the rewritten query data by applying a replaced joining process with the descendant structural condition to the structured document set processed so far.

2. The structured document management device according to claim 1, wherein when a first structural condition out of the extracted structural conditions is divided is a structural condition that intends to acquire a node that is located one layer below, the rewriting includes acquiring a character string designated by the first structural condition and a second structural condition located subsequently to the first structural condition and determines whether the second structural condition is a structural condition that intends to acquire an arbitrary character string of a node that is located one layer above, and when it is determined that the second structural condition is the structural condition that intends to acquire an arbitrary character string of the node that is located one layer above, the rewriting includes transforming the first and second structural conditions into a single rewritten query including a descendant structural condition that designates the character string designated by the first structural condition.

3. The structured document management device according to claim 1, wherein the other structural condition includes at least one of an ancestor structural condition that designates a path from a lower layer to a higher layer, a sibling structural condition that designates an antero-posterior relation on a same layer, and an order structural condition that designates an order relation of elements in XML data within the structural condition.

4. A structured document management method, comprising:

receiving an input of query data for searching a structured document set having a layered logical structure, dividing the query data into elements to extract structural conditions from the elements, rewriting the query data based on a joining process with a descendant structural condition to obtain a rewritten query data, the descendent structural condition designating a path from a higher layer to a lower layer, and searching the structured document set based on the rewritten query data, wherein the rewriting includes replacing only another structural condition than the descendant structural condition among the extracted structural conditions with the joining process with the descendant structural condition without affecting other portions data of the query except for the other structural condition to obtain the rewritten query data, and the searching includes searching the structured document set based on the rewritten query data by applying a replaced joining process with the descendant structural condition to the structured document set processed so far.

5. The structured document management device according to claim 4, wherein the other structural condition includes at least one of an ancestor structural condition that designates a path from a lower layer to a higher layer, a sibling structural condition that designates an antero-posterior relation on a same layer, and an order structural condition that designates an order relation of elements in XML data within the structural condition.

6. A computer program product comprising a non-transitory computer-readable medium containing a program to cause a computer to execute a structured document management method, the method comprising:

receiving an input of query data for searching a structured document set having a layered logical structure, dividing the query data into elements to extract structural conditions from the elements, rewriting the query data based on a joining process with a descendant structural condition to obtain rewritten query data, and searching the structured document set based on the rewritten query data, wherein the rewriting includes replacing only another structural condition than the descendant structural condition among the extracted structural conditions with the joining process with the descendant structural condition without affecting other portions of the query data except for the other structural condition to obtain the rewritten query data, and the searching includes searching the structured document set based on the rewritten query data by applying a replaced joining process with the descendant structural condition to the structured document set processed so far.

7. The structured document management device according to claim 6, wherein the other structural condition includes at least one of an ancestor structural condition that designates a path from a lower layer to a higher layer, a sibling structural condition that designates an antero-posterior relation on a same layer, and an order structural condition that designates an order relation of elements in XML data within the structural condition.

8. A structured document management device, comprising:

a processor; and a memory that stores instructions that when executed by the processor perform operations, comprising:

receiving an input of query data for searching a structured document set having a layered logical structure, dividing the query data into elements to extract structural conditions from the elements, rewriting the query data based on a joining process with a descendant structural condition to obtain a rewritten query data, and searching the structured document set based on the rewritten query data, wherein the rewriting includes replacing only another structural conditions than the descendant structural condition among the extracted structural conditions with the joining process with a combination of the other structural condition, a previous structural condition and a subsequent structural condition with respect to the other structural condition without affecting other portions of the query data except for the combination to obtain the rewritten query data, and the searching includes searching the structured document set based on the rewritten query data by applying a replaced joining process with the combination to the structured document set processed so far.

9. A structured document management method, comprising:

receiving an input of query data for searching a structured document set having a layered logical structure, dividing the query data into elements to extract structural conditions from the elements, rewriting the query data based on a joining process with a descendant structural condition to obtain rewritten query data, and searching the structured document set based on the rewritten query data, wherein the rewriting includes replacing only another structural condition than the descendant structural condition among the extracted structural conditions with the joining process with a combination of the other structural condition, a previous structural condition and a subsequent structural condition with respect to the other structural condition without affecting other portions of the query data except for the combination to obtain the rewritten query data, and the searching includes searching the structured document set based on the rewritten query data by applying a replaced joining process with the combination to the structured document set processed so far.

10. A computer program product comprising a non-transitory computer-readable medium containing a program to cause a computer to execute a structured document management method, the method comprising:

receiving an input of query data for searching a structured document set having a layered logical structure, dividing the query data into elements to extract structural conditions from the elements, rewriting the query data based on a joining process with a descendant structural condition to obtain rewritten query data, and searching the structured document set based on the rewritten query data, wherein the rewriting includes replacing only another structural condition than the descendant structural condition among the extracted structural conditions with the joining process with a combination of the other structural condition, a previous structural condition and a subsequent structural condition with respect to the other structural condition without affecting other portions of the query data except for the combination to obtain the rewritten query data, and the searching includes searching the structured document set based on the rewritten query data by applying a replaced joining process with the combination to the structured document set processed so far.

\* \* \* \* \*